Figure 5:
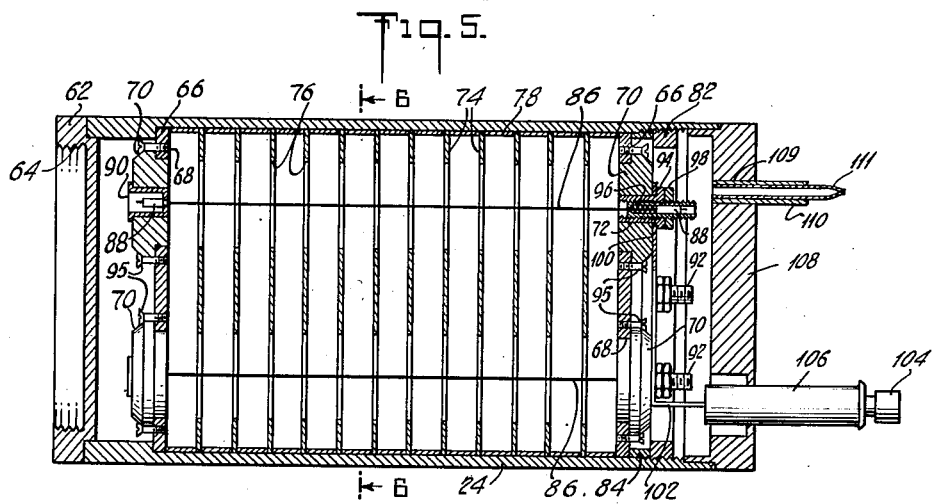

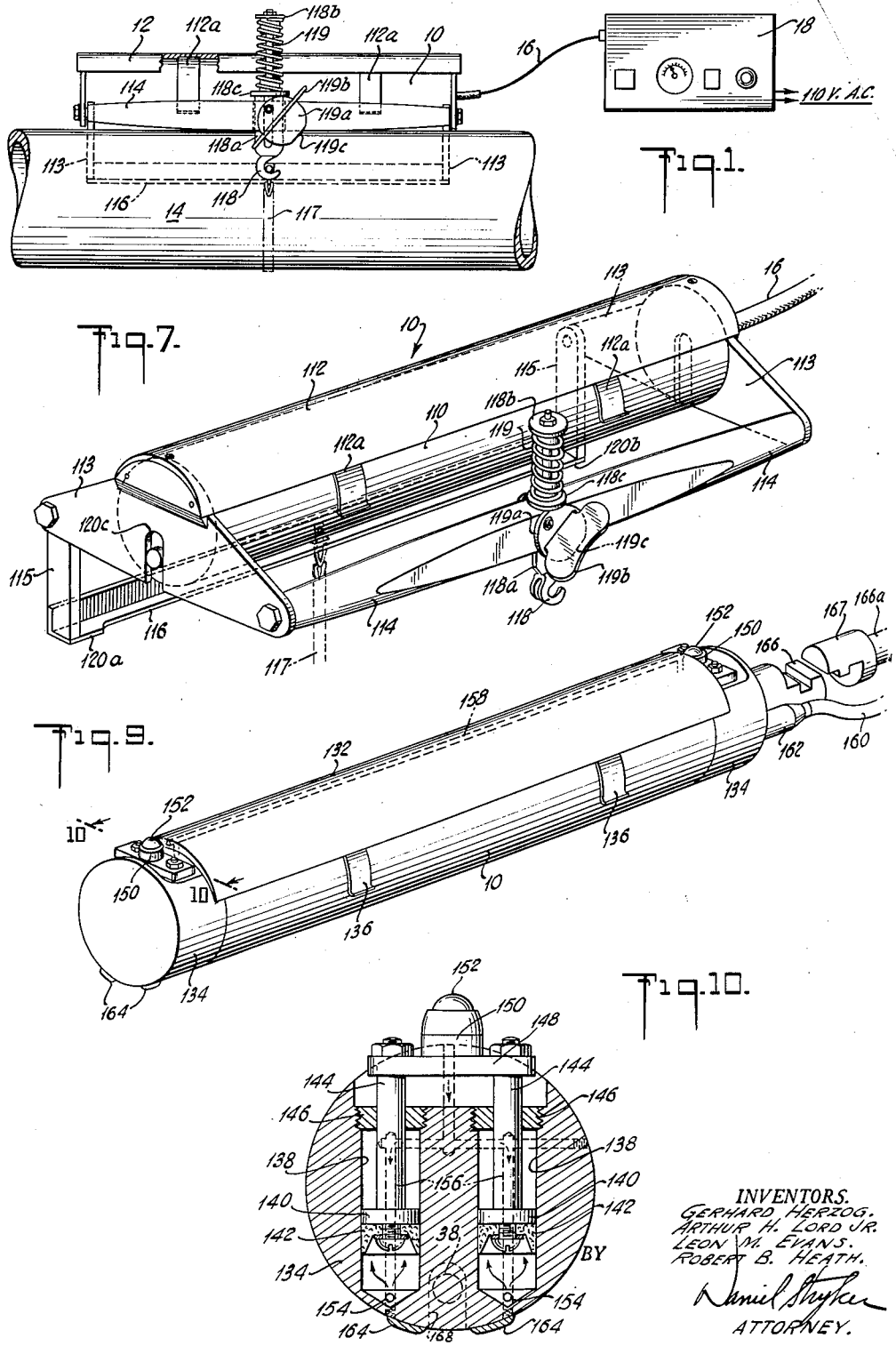

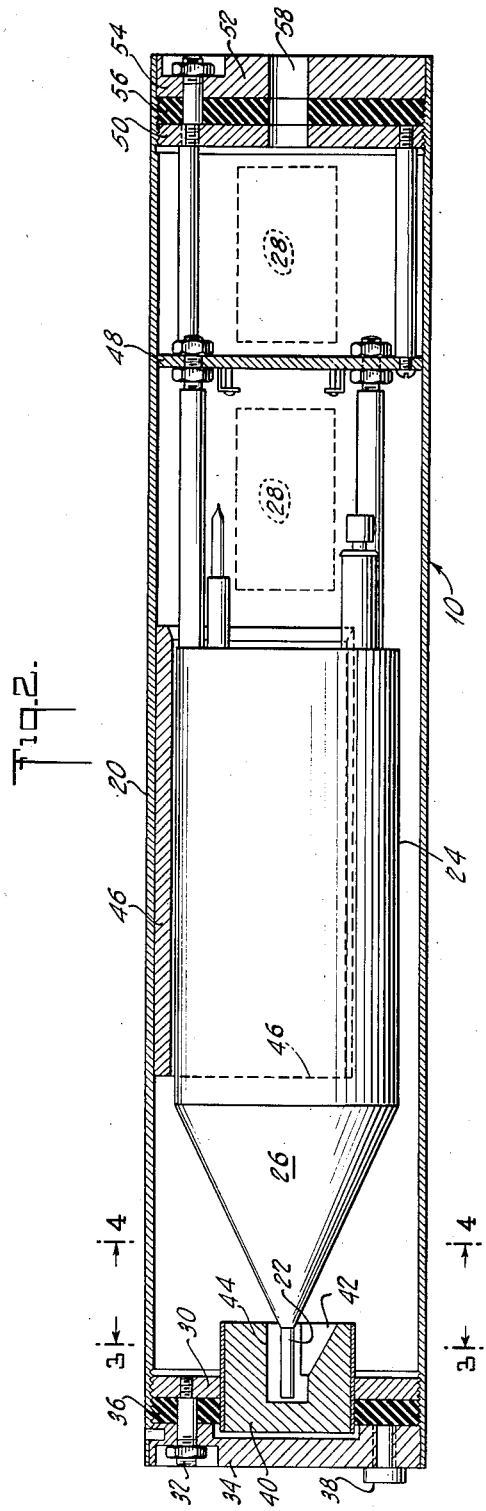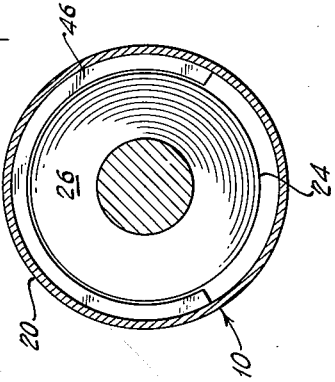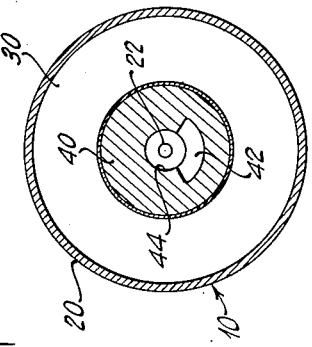

Jan. 2, 1951 G. HERZOG ET AL 2,536,131
MEASURING APPARATUS

Filed Jan. 27, 1945 5 Sheets-Sheet 3

INVENTORS.
GERHARD HERZOG.
ARTHUR H. LORD JR.
LEON M. EVANS.
ROBERT B. HEATH.
BY
ATTORNEY.

Jan. 2, 1951     G. HERZOG ET AL     2,536,131
MEASURING APPARATUS
Filed Jan. 27, 1945     5 Sheets-Sheet 4
Fig. 12a.
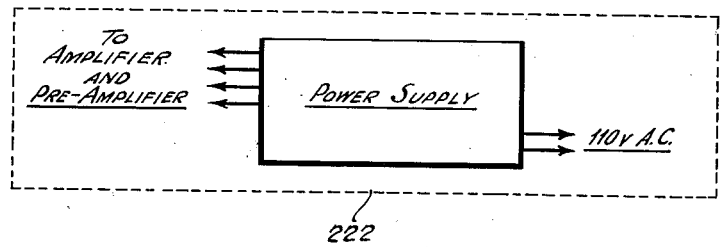
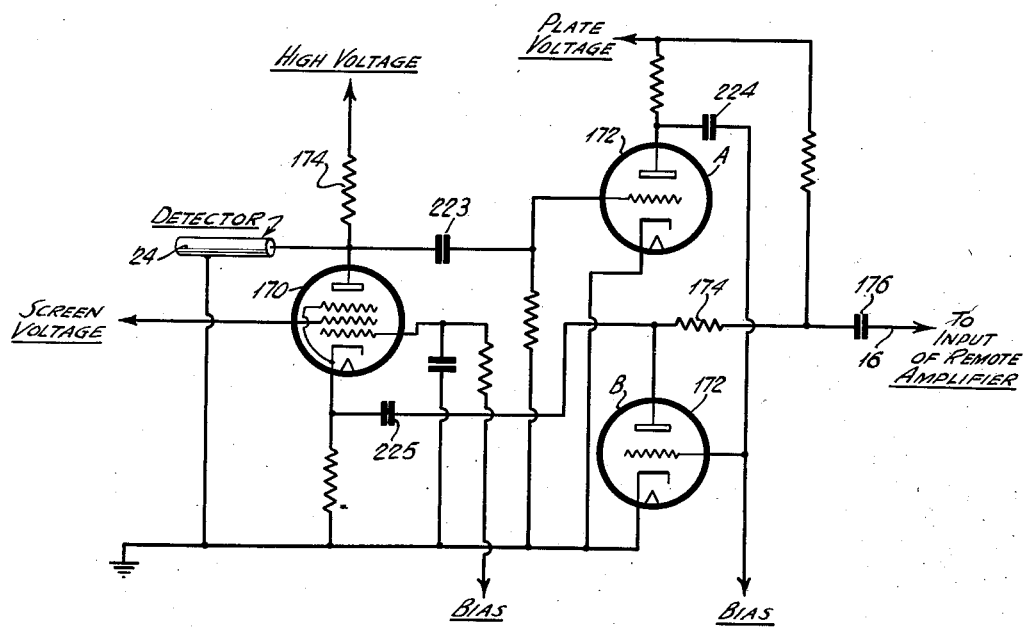
Fig. 11.
INVENTORS.
GERZOG HERZOG.
ARTHUR H. LORD JR.
LEON M. EVANS.
ROBERT B. HEATH.
BY
Daniel Stryker
ATTORNEY.

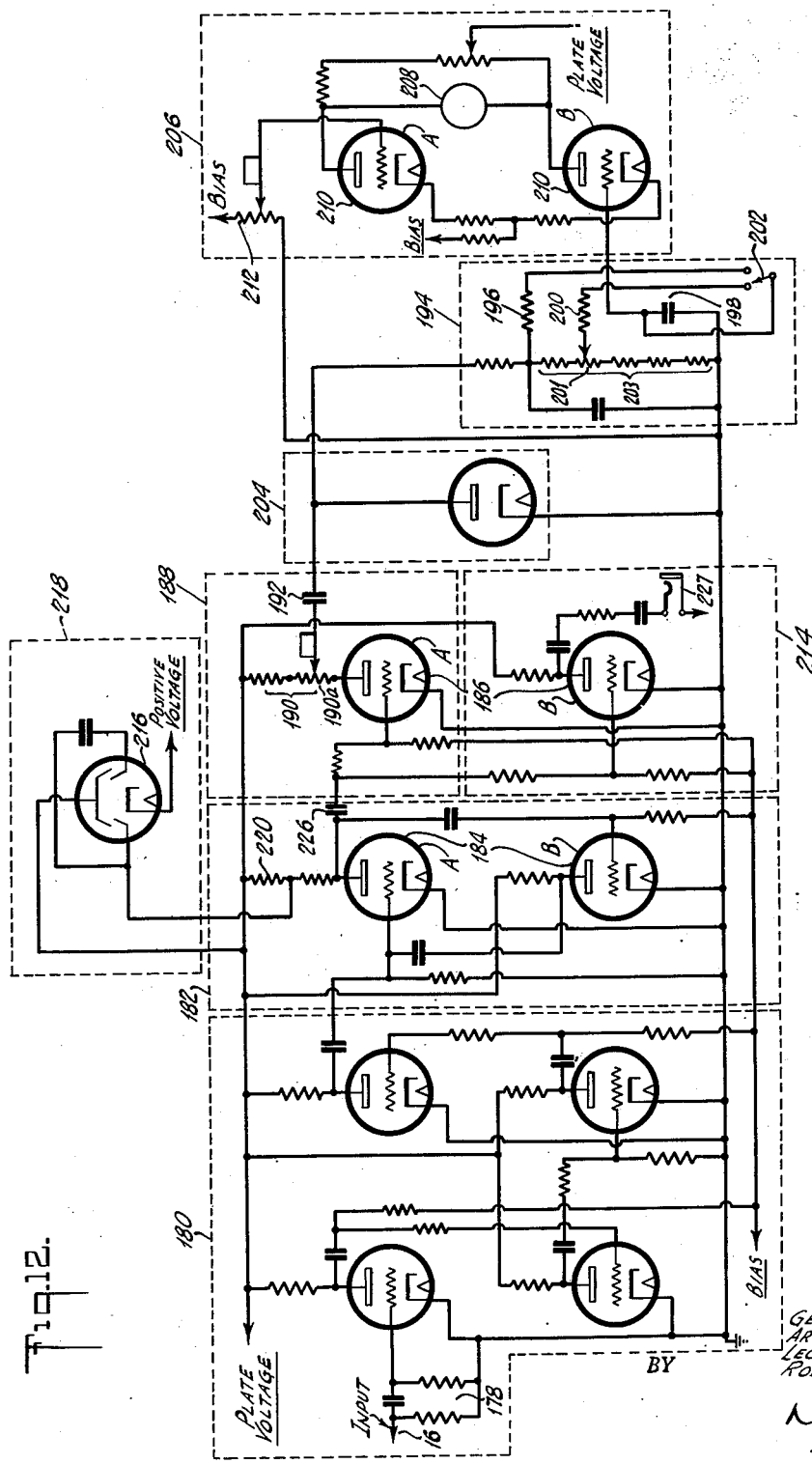

Patented Jan. 2, 1951

2,536,131

UNITED STATES PATENT OFFICE 2,536,131

MEASURING APPARATUS

Gerhard Herzog, Arthur H. Lord, Jr., Leon M. Evans, and Robert B. Heath, Houston, Tex., assignors to The Texas Company, New York, N. Y., a corporation of Delaware Application January 27, 1945, Serial No. 574,870

3 Claims. (Cl. 250—83.6)

This invention relates to measuring apparatus and more particularly to methods and instruments for measuring characteristics of solid bodies such as the thickness of plates, shells, pipe walls and the like and also characteristics of solid or fluid bodies such as the level of a liquid within a container, the density of solids and fluids within containers or flowing through pipes and conduits and the position of the interface between two fluids of different densities in a vessel.

The principal object of the invention is the provision of an instrument by means of which measurements may be made quickly and accurately of characteristics of a solid object or fluid body from one side only without the necessity of access to the interior of a body contained within a vessel or flowing through a pipe or conduit, and without the necessity of taking samples or specimens from the body or object to be examined.

In the U. S. Letters Patent to D. G. C. Hare, No. 2,277,756, granted March 31, 1942, a method and a device are disclosed whereby the thickness of an object such as a plate or tube wall can be measured entirely from one side of the object and without the requirement that any portion of the instrument be placed at the opposite side of the object or that any holes be drilled or cut into or through the object as for the insertion of a calipering device. In accordance with the Hare patent a source of penetrative radiation is placed in proximity to one side of the object the thickness of which is to be measured and radiation such as gamma rays from the source, diffused and scattered within the wall of the object, are returned to a radiation detector placed near the source. Since the amount of back-scattered radiation depends upon the amount of the material in which the scattering takes place, a measurement of this back-scattered radiation provides a measure of the thickness of the object.

In the U. S. Letters Patent to Hare Nos. 2,304,910 and 2,348,810, granted December 15, 1942, and May 16, 1944, respectively, methods and apparatus are disclosed embodying the principles set forth in the aforementioned Hare Patent 2,277,756 and by means of which the densities of fluids in containers, or flowing through pipes, and the level of a liquid in a vessel can be quickly ascertained.

The present invention relates to an improved instrument and associated apparatus involving generally the principles and accomplishing the results attained by the methods disclosed in the three mentioned Hare patents. Through the utilization of the present invention measurements can be made in less time and with a much smaller amount of radioactive substance in the source than formerly. Furthermore, measurements of thickness, for instance of the wall of a pipe or tube can be made continuously, i. e., by moving the instrument continuously along the surface of the pipe as distinguished from holding it in a fixed position at a plurality of points in sequence on the pipe surface.

In accordance with the invention, the instrument proper comprises a cylindrical casing with means for securing it, if desired to a flat surface or to the outer or inner surface of a curved object such as the wall of a pipe. Within the casing is a source of radium of about 1 mg., a highly sensitive radiation detector of the counter type such as is disclosed generally in the U. S. Letters Patent of D. G. C. Hare, No. 2,397,071, granted March 19, 1946. Between the source and the detector is a shield of a high density, high atomic number metal such as a tungsten alloy, and surrounding a portion of the detector is a shield capable of absorbing unwanted scattered gamma rays. Also disposed in one end of the instrument casing is a preamplifier which has three purposes; firstly, to assist in the quick quenching of the counter thereby prolonging its lifetime; secondly, because of its close proximity to the detector, to reduce the electrostatic capacity connected to the detector whereby higher counting rates can be used; and thirdly, to amplify the current pulses of the detector to such a degree that they can be transmitted through a fairly long cable to provide useful signals. The output of the preamplifier is led through a connecting multi-conductor cable to a combined amplifier unit and power supply mounted within a carrying case and from which connection can be made to any convenient electric power source, such as 110 volt 60 cycle alternating current.

The amplifier unit contains several stages of amplification which serve to amplify, equalize and sharpen the incoming pulses; a multi-vibrator for equalizing the pulses as to their amplitude and widths; a phase inverter for changing positive pulses to negative pulses; a rectifier for removing the back wave; an integration circuit for transforming the pulses into a direct-current voltage the size of which is proportional to the intensity of the gamma rays actuating the counter; and an electronic voltmeter for measuring this direct-current voltage which includes an output meter for indicating the value of the measured direct-current voltage. The power supply furnishes the high voltage for the counter and also voltages for the preamplifier and amplifier in such a way that they are substantially independent of changes in line voltage. The power supply also provides means for indicating when the starting voltage on the counter has been reached, as well as means for setting the high voltage on the counter a given amount above its starting value.

Figure 6:
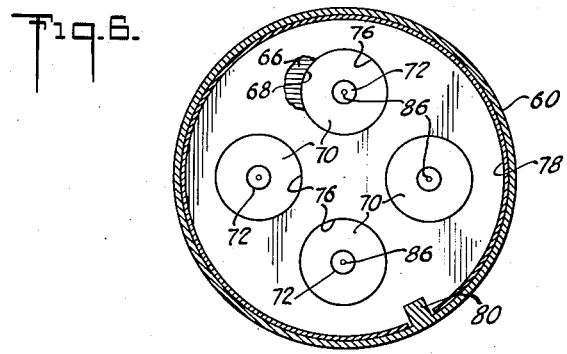
Figure 8:
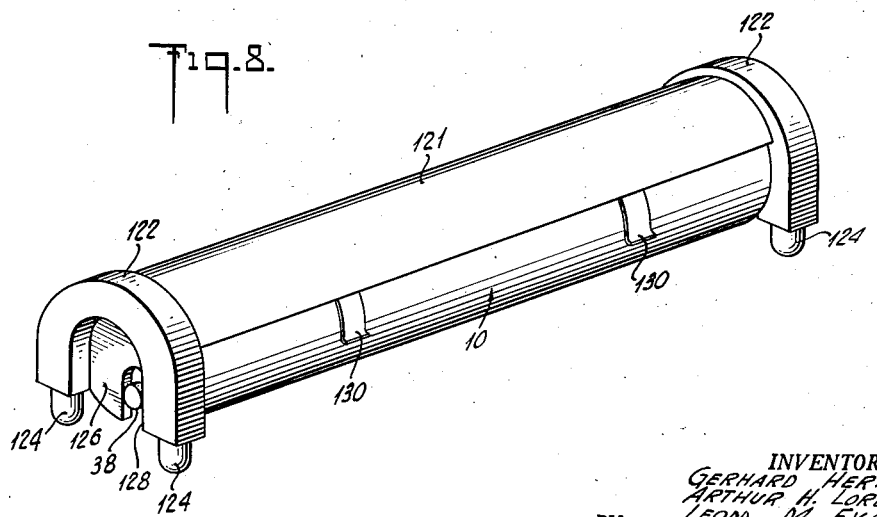

For a better understanding of the invention reference may be had to the accompanying drawings in which Fig. 1 is a somewhat diagrammatical elevation showing the instrument clamped to the outer surface of a pipe, the wall thickness of which it is desired to measure, Fig. 2 is a sectional elevation through the measuring instrument proper, Fig. 3 is a section on line 3—3 of Fig. 2 looking in the direction of the arrows, Fig. 4 is a section of the line 4—4 of Fig. 2 looking in the direction of the arrows, Fig. 5 is a sectional elevation through the radiation detector, Fig. 6 is a section on the line 6—6 of Fig. 5, Fig. 7 is an isometric view showing the external clamping harness attached to the instrument, Fig. 8 is an isometric view showing the magnet harness or frame, Fig. 9 is an isometric view showing the clamping frame for use inside a pipe or a tube, Fig. 10 is a sectional elevation through one end of the inside clamping frame of Fig. 9, Fig. 11 is a circuit diagram of the preamplifier, Fig. 12 is a circuit diagram of the amplifier, and Fig. 12a is a diagram of the power supply.

In Figure 1 the instrument proper 10 is shown as attached by means of a harness or frame 12 to the outer surface of a section of pipe 14, the wall thickness of which it is desired to measure. The instrument 10 is connected by means of a multi-conductor cable 16 to the combined amplifier unit and power supply mounted within the carrying case 18. A connecting cord, not shown, extends from the case 18 and is adapted to be connected to a source of 110 volt alternating current supply. Fig. 1 shows the apparatus in position for making a thickness measurement.

Referring to Figs. 2, 3 and 4 the instrument proper, i. e., the device which is adapted to be placed against or in close proximity to the object or body the characteristics of which it is desired to measure is shown as housed within a cylindrical casing 20 which may be of any suitable material such as brass or aluminum. Within the casing 20 is disposed a source of radioactive material indicated by the capsule 22, a shield member 26 for preventing direct radiation from the source 22 to pass to the detector 24, and the preamplifier indicated diagrammatically by the dotted rectangles 28, the preamplifier occupying the space within the right hand portion of the casing 20 in viewing Fig. 2. In the left hand end of the casing 20 a disc or plate 30 of brass or other suitable metal is threaded to the inner surface of the casing and serves to support by means of bolts 32 an end closure plate 34 preferably of aluminum or brass. Disposed between the plates 30 and 34 is a disc 36 of a compressible material such as rubber which expands when the bolts 32 are tightened, to seal the left hand end of the casing. Disposed within the plate 34 is a screw or bolt 38, the purpose of which is to engage a slot within one of the clamping harnesses or frames so that the instrument will be maintained in a predetermined position with regard to the frame, as will be explained hereinafter. Mounted in the plate 30 is a cup-shaped member 40 of a metal such as lead, capable of absorbing gamma radiation from the source 22 and this member is provided with a slot 42 disposed so that radiation from the source 22 can pass freely downwardly toward the right where it will enter and be diffused within a plate or other object to which the instrument is attached for measurement.

The detector or counter 24 is shown as cylindrical in shape and is mounted substantially concentrically within the casing 20. The shield member 26 is preferably in the shape of a cone the base of which is attached to one end of the detector and the capsule 22 containing the source is attached to the apex of the cone. When assembled, the capsule 22 is disposed entirely within the small space 44 in the shield 40 and it will be observed from a study of Fig. 2 that all direct radiation from the source passing toward the detector 24 must pass into the shielding cone 26. It has been found that the high density or high atomic number metals such as tungsten, gold, platinum, iridium and the like form ideal shields for the direct gamma radiation since these metals have the property of absorbing relatively large amounts of penetrative radiation for a small volume of the metal. This is an important feature of this invention since through the use of such a shield it is possible for the radiation source to be located relatively close to the detector, and because of this close proximity between the source and the detector the length of the path of the radiation from the source into the object to be examined, and thence from the object into the detector, is quite small. Therefore it is possible to secure accurate measurements while utilizing a very small amount of the radioactive material such as, for instance, about one mg. of radium. It has been found that tungsten or an alloy comprising substantially 99% tungsten such as "Mallory 1000" is a very satisfactory shield for the direct radiation.

Disposed within the space between the detector 24 and the casing 20 and surrounding the top and sides of the detector is a shield member 46 of a high density metal such as lead, capable of absorbing radiation which might pass upwardly or outwardly, from the source 22 to encounter objects other than the one being examined and from which other objects part of this radiation might be scattered back to the detector. As shown in Fig. 4 the shield member 46 encloses about two-thirds of the outer surface of the counter 24 leaving an open or unshielded space of approximately 120 degrees around the lower portion of the detector so that there will be no interference or shielding of the radiation scattered back toward the detector from the object being measured. The scattered radiation is less penetrating than the primary gamma rays; therefore a much smaller thickness of the shield member 46 is sufficient to absorb the scattered radiation.

Within the casing 20 to the right of the detector 24 is a lateral plate or disc 48 which may be either of metal or an insulating composition, the purpose being to afford a base for elements of the preamplifier 28. The closure for the right hand end of the casing 20 is substantially the same as that already described for the left hand end. A metal disc or plate 50 is threaded into casing 20 and an end closure plate 52 preferably of aluminum is attached to the plate 50 by means of bolts 54. Between the plates 50 and 52 is a disc 56 of rubber or the like adapted to be compressed by the tightening of the bolts 54 for sealing the end of the casing. The three discs 52, 56 and 50 are provided with a center opening 58 in which an end of the multi-conductor cord or cable 16 is secured, the cable conductor being connected, of course, to the elements of the preamplifier shown in Fig. 11. The cable entrance 58 is sealed by the disc 56 when bolts 54 are tightened.

The radiation detector 24 is in the form of a counter for the gamma rays emitted from the source 22 and which are scattered back to the detector from the object being examined. As shown more clearly in Figures 5 and 6 the counter comprises a housing 60 preferably cylindrical in cross section formed of any suitable substance such as brass. The left hand end of the housing 60 is closed by means of a cover member 62 internally threaded as at 64 to receive a threaded portion of the shield cone 26 (Fig. 2). Disposed near the opposite ends of the housing 60 are a pair of discs 66, each disc containing a plurality of holes 68, in this instance shown as four in number, each hole being occupied by an insulating plug or button 70 containing a center hole 72. Between the discs 66 are a plurality of thin discs or plates 74 of a suitable metal such as brass, each plate being provided with a number of holes 76 of the same size and number as the holes 68 in the discs 66. The cathode plates 74 are held in separated relation by means of spacer rings 78. A projection or key 80 is disposed longitudinally along the inner surface of the housing 60 and the discs 66 and the cathode plates 74 and the spacer rings 78 are provided with cut-out portions fitting over this key so that the parts mentioned will be maintained with the several series of holes 68 in alignment. An externally threaded ring 82 cooperating with threads on the right-hand end of the housing 60 is adapted to be forced against a spacer ring 84 so as to squeeze the discs 66, cathode plates 74 and spacer rings 78 tightly together. Through each series of holes 76 an anode wire 86 is disposed, the left hand end of each wire being provided with an enlargement 88 adapted to be housed within and to bear against the bottom of a cup 90 fitting within the hole 72 in an insulator button 70. The other end of each anode wire is also provided with an enlargement 86 housed within an externally threaded elongated cup or hollow bolt 92 adapted to be screwed into a cup member 94 fitting within a hole 72 in an insulator button 70. Between the enlargement 88 at the right hand end of each anode wire and the bottom of each cup 92 is a small spring 96. The insulator buttons 70 are held in place by the heads of screws 95 attached to the plates 66.

A predetermined tension is maintained on each anode wire 86 and this tension is placed on the wire in the following manner: the parts are assembled substantially as shown in Fig. 5 and the cup 92 is engaged by a suitable tool and pulled toward the right until the wire is under the desired tension which can be measured by any suitable means. The cup 92 is held in that position while the outer cup 94 is screwed to the left until its enlarged head engages the insulating button 70 and a lock nut 98 is tightened on each of the cups 92. The wire 86 will then remain under the desired tension and the other anode wires are placed under tension in the same manner. A thin metallic disc 100 having holes corresponding to the position of the holes 72 in the insulated buttons is placed so that it will be engaged by the cups 94, and a wire 102 is soldered at one end to this connecting plate 100 and at its other end to a metal cap 104 on the outer end of an insulated bushing 106 secured to the right hand closure plate 108 which may be attached to the end of the housing 60 as by soldering or welding. The end plate 108 is also provided with an opening 109 containing a sleeve 110 in which is mounted a small tube 111 through which the interior of the counter can be filled with a suitable gas such as a mixture of argon and petroleum ether. After the filling is placed in the counter the end of the tube 111 is crimped so as to seal the interior of the counter.

When making a measurement, for example of the thickness of the wall of a section of tubing, it is preferred that the instrument 10 be in rigid contact with the surface of the tube section as shown roughly in Fig. 1 and it is also necessary that the instrument be placed in position on the object to be examined with the portion of the detector 24, which is unshielded by the member 46, facing the object. Three forms of "harnesses" or clamping frames are described in Figures 7, 8 and 9 whereby the instrument can be attached either to the outer surface or to the inner surface of a section of tubing, the thickness of which it is desired to measure.

In Fig. 7 a frame or harness is illustrated which is particularly well suited to the problem of holding the instrument which has been described, substantially rigidly against the outer surface of a section of pipe or tubing the wall thickness of which is to be measured. The clamp or harness device shown in Fig. 7 is described more completely in the copending application of Evans and Heath Serial No. 574,954, filed January 27, 1945, now Patent 2,524,436, and is also shown in use in Fig. 1. Assuming that the pipe section to be examined is straight, it is necessary that the instrument 10 be positioned in exact axial alignment with the pipe so that the axis of the instrument and the axis of the pipe are parallel. In addition to being properly aligned, it is important that in all tests the same portion of the periphery of the instrument be exposed to the surface of the pipe to be measured since, by so positioning the instrument, reproduceability of the results can be obtained. The harness shown in Figure 7 comprises a back or bridge member 112 which conforms generally to the shape and size of the instrument 10. Spring members 112a are attached to and depend from the bridge member 112 and are designed so as to slip over the instrument 10 and hold the latter snugly in position against the underface of the bridge member. Attached to the opposite ends of the bridge 112 are triangular end plates 113 arranged opposite each other with the ends of each plate projecting laterally from the ends of the instrument 10. In viewing Figure 7 one end of the left hand plate 113 is connected to the corresponding end of the other plate by means of a bar 114, and from the other ends of each plate 113 a pair of arms 115 depend from pivotal connections. The lower ends of the arms 115 are inter-connected by means of an angle bar 116. Mounted at the center of the bar 114 is a tension mechanism which, as will be explained, cooperates with a length of chain 117 to maintain the clamping device and the pipe, not shown, to which it is attached in rigid contact during periods when measurements are being made. A hook member 118 having a bifurcated portion 118a extends vertically through a slot in the bar 114 and is provided at its upper end with an abutment 118b. Another abutment 118c is slidably mounted on the upper portion of the hook member 118, and between the two abutments a compression spring 119 is disposed. A cam member 119a is pivotally and eccentrically mounted on one side of the bar 114 and is provided with a wing or handle 119b and a flat edge portion 119c to cooperate with the underside of the abutment or collar 118b when the cam is turned about its pivot. The left hand end of the chain 117 is permanently connected to the center point of the angle bar 116 and the major portion of the front surface of the member 116 is slightly recessed so as to provide contact surfaces or points 120a and 120b which lie in the same plane.

In operation, the instrument 10 is placed within the harness or frame member as is shown in Figure 7 and is held in that position by means of the springs 112a. The bolt 38 previously described as located at one end of the instrument 10 slides within a slot 120c in one of the end plates 113 and the instrument is thus held in a predetermined angular position such that the unshielded portion of the detector 24 (Fig. 2) will face downwardly when viewing Figure 7 or toward the adjacent surface of the pipe section to be examined. The harness member is then placed against or upon the pipe section, the wall thickness of which is to be measured, and the chain 117 is placed around the lower portion of the pipe as shown in Figure 1 and is attached to the hook member 118. The two contact points 120a and 120b will then engage the wall of the pipe and since these two contact points are in the same plane, the axial plane of the clamp or harness is aligned parallel to the axis of the pipe under test. The cam 119a is then turned by means of the handle 119b so as to push the abutment 118b upwardly until the latter is engaged by the flat cam surface 119c. The force exerted by the spring 119 will then tend to push the abutment 119 and the hook member 118 upwardly so as to tighten the chain 117 and thus connect the clamp and the instrument 10 supported therein tightly to the pipe to be examined.

In Figure 8 a frame is disclosed by means of which the instrument 10 can be secured in a predetermined position to a curved or to a flat plate of magnetic material by means of permanent magnets. A frame comprising an elongated back or bridge member 121 is provided at its ends with members 122 which comprise permanent magnets having poles 124. The two magnets 122 are mounted so that the poles 124 will all be in the same plane. At the inner side of one magnet 122 is a plate or disc 126 having a slot 128. Attached to the under side of the back member 121 are a pair of curved spring members 130 adapted to engage the casing of the instrument 10 and to hold it snugly. The small bolt 38 shown in Figure 2 is so arranged on the plate 34 that its projecting head fits within the slot 128 whereby the unshielded portion of the detector 24 will be at the bottom and parallel to the plane containing the magnet poles 124. The length of the magnet poles is such that when the ends of the poles engage the surface of the object to be examined the bottom of the casing 10 will be in contact with or very slightly separated from the surface of the object. In making a measurement on a plate of magnetic material it is of course merely necessary to place the frame holding the instrument 10 against the plate and it will adhere due to the pull of the magnets.

It is often desirable to make a measurement of wall thickness from within a tube or pipe. In Figures 9 and 10 an inside harness or clamping frame is illustrated which in some ways is similar to the frame described and illustrated in Figure 8. With reference to Figure 9 an elongated back or bridge member 132 has attached to each of its ends a small circular plate 134 in such a manner that the instrument 10 will fit within the frame, the end plates 32 and 52 of the instrument closely adjacent or bearing against the inner surfaces of the plates 134. As was described in Figure 8 the back member 132 has depending therefrom a pair of spring members 136 adapted to engage the casing of the instrument 10 to hold it firmly in position. As shown in Figure 10 each member 134 is provided with a pair of parallel cylinders 138 disposed substantially perpendicularly to the bridge member 132. Within each of the cylinders 138 is mounted a small piston 140 having a packer 142 and a rod 144, each rod having a bearing within a disc-like packer 146. The ends of the two piston rods 140 are attached to an arm 148 from the center of which a finger or projection 150 extends upwardly. At the end of each finger is a small contact member 152 preferably having a curved outer surface. The lower ends of cylinders 138 are provided with openings 154 leading to passages 156 which in turn connect with a passage 158 extending longitudinally through the bridge member 132 (Figure 9). A flexible tube 160 is adapted to be secured to a connecting pipe 162 projecting from the right-hand plate 134, the pipe 162 being connected with the passages 156 and 158 so that when air pressure is admitted to the tube 160 the air will pass to the cylinders 138 to force the pistons outwardly, thus causing the contact members 152 to bear against the inner surface or pipe to be measured and forcing the bottom of the instrument 10 downwardly against the opposite inner surface of the tube to the point where it is desired to measure thickness. The bottom surfaces of the plate 134 are provided with a pair of projections or feet 164 which bear against the surface of the tube so as to hold the bottom of the instrument 10 closely adjacent that surface of the tube. The fingers 150 can, of course, be made up in sections which can be screwed together so that by adding or subtracting sections the length of the fingers can be adjusted for tubing of different diameters. Since the instrument as shown in Figure 9 must on some occasions be used within and some distance from the open ends of a tube to be measured, a coupling 166 is provided on the plate 134 to which the tubing 160 is attached, so that a rod or pole 166a, when attached to the coupling 166, can be used to push or pull the instrument through the tubing. If desired a knuckle or universal joint a portion of which is shown at 167 can be disposed on the coupling 166 and at the end of the pole. As shown by dotted line in Figure 10 the inner surface of one of the plates 134 is provided with a slot or groove 168 similar to the slot 128 of Figure 8, the groove 168 being adapted to cooperate with the projecting bolt 38 so as to hold the instrument 10 within the frame or harness with the unshielded portion of the detector 24 (Fig. 2) at the bottom, as was described with reference to the frames of Figures 7 and 8, and the pole 166a is provided with any suitable means for indicating to the operator the angular position of the instrument when it has been pushed into a pipe or tube the wall thickness of which is to be measured.

As has been mentioned previously, a vacuum tube preamplifier shown diagrammatically at 28 in Figure 2 is disposed within the instrument casing 20 at the end opposite the radiation source 22. The circuit for this preamplifier is shown in Figure 11 in which the detector or counter 24 is shown together with a pentode 170 and a twin triode 172. A D. C. high voltage suitable for operating the detector 24, is connected through a resistor 174 to the anode of the detector and to the plate of "quench" tube 170, as shown. This tube may be of the type 7C7, for example. When the detector 24 discharges, a voltage pulse from the anode of the detector is fed through a small condenser 223 to the grid of section A of twin triode 172 which may be a type 7F7 tube, for example. In this section the pulse is amplified and from the plate fed through a coupling condenser 224 to the grid of section B. In this second stage the pulse is further amplified and reversed as to its polarity. This pulse being now negative, is coupled back from the plate of section B through a condenser 225 to the cathode of tube 170. For each pulse in the detector 24 the potential of the cathode of tube 170 is lowered with respect to ground and thereby the current through this tube is increased. Consequently the voltage at its plate, i. e., at the plate end of the plate resistor 174, is decreased, which in turn lowers the voltage at the anode of the detector below the starting potential and thereby quenches the discharge. The pulses are fed from the plate of amplifier tube 172 through resistor 174 and coupling condenser 176 to the cable represented at 16. Proper operating voltages should be applied to the appropriate elements of the circuit in any well known manner.

In Figure 12 is shown the circuit of the amplifier proper. The pulses from the preamplifier shown in Figure 11, enter through the cable 16, and through a filter 178 to a 4-stage capacitance-coupled amplifier shown within the dotted line 180 which may employ type 7F7 tubes, for example. Its output is coupled to a multi-vibrator circuit shown within the dotted line 182 and comprising a twin triode 184, the purpose of which is to equalize the individual pulses both as to their amplitude and width. As in Figure 11, this twin triode may be of the 7C7 type. From there the pulses, which are now substantially of square form, go to a triode 186 the purpose of which is to reverse their polarity or phase. This phase inverter is shown within the dotted line 188. The inverted pulses are taken off at the plate resistor 190. A part of this resistor comprises a variable potentiometer 190a, whereby the amplitude of the pulses can be adjusted independently of the pulse rate.

From the arm of the potentiometer 190a the pulses are fed through a coupling condenser 192 to the input of an integration circuit, shown within the dotted line 194. In an integration circuit the electrical charges of the pulses pass through a resistance and are collected on a capacitance, whereby a D. C. voltage is built up across the capacitance which is proportional to the pulse rate. Such an integration circuit may consist of the resistor 196 and the capacitance 198. Actually, two such circuits are here provided, the second consisting of resistor 200 and the same capacitance 198. A selection between the two circuits can be made with the switch 202. The resistors in the two integration circuits are selected in such a way that the time constants (resistance multiplied by capacitance) may have a ratio of 1 to 10, for example. By selecting with switch 202 the circuit with the shorter time constant, measurements can be made faster but with a lesser degree of accuracy because of larger voltage fluctuations at the capacitance 198 due to the statistical distribution in time of the pulses. By selecting the other circuit the measurement requires more time but a higher accuracy is obtained.

The amplitude of the pulses which are fed through resistor 200 to the integration condenser may be adjusted by the potentiometer 201 which is a part of the resistor 203. By this arrangement the voltage across condenser 198 for a given counting rate can be made the same for both positions of switch 202. If this adjustment in amplitude were not made, this voltage might be slightly different for the two positions of the switch due to different attenuation by leakage in the condenser 198.

Connected in parallel to the integration circuit is a vacuum tube rectifier shown within the dotted line 204, the purpose of which is to remove the positive back wave which is invariably associated with each negative pulse due to the capacitance coupling in the amplifier. This rectifier may conveniently comprise a diode as shown. By this circuit 204 the back waves are shorted out to ground.

The voltage across the integration capacitance 198 is measured with an electronic or vacuum tube volt meter of the balanced type shown within the dotted line 206. The circuit of this type of meter is well known to those versed in the art, and may employ any suitable type of vacuum tubes, the 6F8G twin triode being here represented. The output of the voltmeter is measured by a current meter 208, which may, for example, have a range of 500 micro-amperes. The indications of this current meter are then proportional to the pulse rate of the counter. For a given counting rate, the absolute value of the current through the meter 208 can be changed by adjusting the bias on section A of tube 210 with the help of the potentiometer 212.

For purposes of control it is sometimes advantageous to measure the counting rate directly with a mechanical counter. To this end the circuit shown in the dotted line 214 is provided. The pulses are taken from the multi-vibrator 182 through a coupling condenser 226 to section B of tube 186. To its plate the mechanical counter can be coupled directly through a jack 227, or through a suitable scaling circuit. The purpose of having a separate tube (section B of tube 186) is that the action of the circuit will then be the same regardless of whether the mechanical counter is being used, or not.

The electrical indicator or "eye" 216 shown within the dotted line 218 is connected across the part 220 of the plate resistor of section A of tube 184 of the multi-vibrator 182. For each pulse the electronic beam in the indicator is moved from one position to another. This change can be observed visually on the fluorescent screen which is a part of the indicator eye, as is well known. The detector is normally operated at a voltage which is higher by a certain amount than its starting voltage. The starting voltage is, of course, that voltage at which the detector begins to discharge under the action of gamma rays.

The power supply, which is shown in Figure 12, should include means for regulating and adjusting the high voltage supplied to the tube 170 and the detector 24 shown in Figure 11. If a new detector is installed in the equipment the high voltage at the power supply is adjusted to a low value. It is then gradually increased until the detector starts to operate, which point can be observed by the flickering of the indicator eye 216. This setting of the high voltage is then the voltage which corresponds to the starting or counting potential of the detector. In the power supply, means such as a switch is installed which is kept in one position during the above operation. By changing the switch to another position the starting voltage is raised by a given amount which brings the voltage supply to the detector to its normal operating value. The power supply shown in Figure 12 within the dotted line 222, should be understood to contain elements to supply all the necessary voltages for the various circuits when it is energized from a suitable source of alternating or direct current, in a manner well known to those versed in the art.

Obviously many modifications and variations of the invention, as hereinbefore set forth, may be made without departing from the spirit and scope thereof, only such limitations being imposed as are indicated in the appended claims.

We claim:

1. A device for measuring the thickness of a tube wall from the inner side thereof comprising an elongated cylindrical casing, a source of penetrative radiation within said casing, a cylindrical radiation detector disposed substantially concentrically within said casing and spaced from said source, a vacuum tube preamplifier contained within said casing and connected to said detector, means within said casing for shielding the detector from direct radiation from said source, means for indicating the amount of radiation from said source scattered within a section of the tube wall and thence impressed on said detector, a flexible conductor cable connecting the output of said preamplifier with said indicating means, and means for clamping said casing to the inner surface of said tube wall, said clamping means comprising an elongated frame having a front side and a back side and adapted to releasably engage said casing, the ends of said frame being provided with cylinders disposed laterally of the frame, pistons in said cylinders, a contact member attached to each of said pistons, and means for supplying fluid under pressure to said cylinders to force said pistons outwardly in a lateral direction so that said contact members will engage the inner surface of said tube at the back side of the frame to force the front side of the frame against the opposite inner surface portion of said tube to be measured.

2. In an apparatus for measuring the intensity of scattered gamma rays impressed upon a detector of the pulse producing type, pulse-indicating means for effectively indicating the intensity of gamma rays impressed on said detector, a flexible conductor cable connecting the output of said detector with said indicating means, said indicating means comprising a vacuum tube circuit including an amplifier circuit for the pulses from said detector, a rectifier for removing the unwanted back wave of said pulses, an integration circuit for transforming the pulses to a D. C. voltage the value of which is proportional to the intensity of the scattered gamma rays, said integration circuit having two different time constants and means for selecting the shorter time constant when less accuracy is required and the longer time constant when greater accuracy is required while maintaining said D. C. voltage unchanged, an electronic voltmeter for measuring said D. C. voltage, a vacuum tube power supply for supplying operating voltages to said circuits and said detector, means for indicating when the starting voltage for the detector has been reached and means for setting the voltage for the detector at a predetermined value above said starting voltage.

3. In an apparatus for measuring the intensity of scattered gamma rays impressed upon a detector of the pulse producing type, pulse-indicating means for effectively indicating the intensity of gamma rays impressed on said detector, a flexible conductor cable connecting the output of said detector with said indicating means, said indicating means comprising a vacuum tube circuit including means for amplifying and sharpening the pulses from said preamplifier, a multi-vibrator for equalizing the amplified pulses as to their amplitudes and widths, means for adjusting the resultant amplitude to a predetermined value, a phase inverter for changing positive pulses to negative pulses, a rectifier for removing the unwanted back wave of said negative pulses, an integration circuit for transforming the negative pulses to a D. C. voltage the value of which is proportional to the intensity of the scattered gamma rays, an electronic voltmeter for measuring said D. C. voltage, a power supply for furnishing operating voltages for said circuits and a high voltage to said detector, means for indicating when the starting voltage for the detector has been reached and means for setting the high voltage for the detector at a predetermined value above said starting voltage.

GERHARD HERZOG.
ARTHUR H. LORD, Jr.
LEON M. EVANS.
ROBERT B. HEATH.

REFERENCES CITED

The following references are of record in the file of this patent:

UNITED STATES PATENTS

| Number | Name | Date |
|---|---|---|
| 2,197,453 | Hassler | Apr. 16, 1940 |
| 2,264,725 | Shoupp | Dec. 2, 1941 |
| 2,277,756 | Hare | Mar. 31, 1942 |
| 2,296,176 | Neufeld | Sept. 15, 1942 |
| 2,323,484 | Neufeld | July 6, 1943 |
| 2,349,429 | Herzog | May 23, 1944 |
| 2,369,672 | Hare | Feb. 20, 1945 |
| 2,397,071 | Hare | Mar. 19, 1946 |

OTHER REFERENCES

Compton: X-Rays and Electrons, D. Van Nostrand Co., 1926, pp. 6, 7, 8, 184, and 185. (Copy in Div. 54.)

"Journal of Bureau of Standards," vol. 23, July 1939, pages 137 to 143.